United States Patent
Ichikawa

(10) Patent No.: US 9,069,233 B2
(45) Date of Patent: Jun. 30, 2015

(54) MIRROR UNIT AND IMAGE CAPTURING APPARATUS

(75) Inventor: Yoshiki Ichikawa, Kawasaki (JP)

(73) Assignee: NIKON CORPORATION, Tokyo (JP)

(*) Notice: Subject to any disclaimer, the term of this patent is extended or adjusted under 35 U.S.C. 154(b) by 1 day.

(21) Appl. No.: 13/547,691

(22) Filed: Jul. 12, 2012

(65) Prior Publication Data

US 2013/0016272 A1  Jan. 17, 2013

(30) Foreign Application Priority Data

Jul. 14, 2011 (JP) .................................. 2011-155972

(51) Int. Cl.
*H04N 5/225* (2006.01)
*G03B 19/12* (2006.01)

(52) U.S. Cl.
CPC ........ *G03B 19/12* (2013.01); *G03B 2205/0053* (2013.01)

(58) Field of Classification Search
None
See application file for complete search history.

(56) References Cited

U.S. PATENT DOCUMENTS

| 5,253,004 | A | 10/1993 | Umetsu et al. | |
| 6,169,856 | B1* | 1/2001 | Sakamoto et al. | 396/111 |
| 2006/0215040 | A1* | 9/2006 | Sugawara | 348/220.1 |
| 2007/0019203 | A1* | 1/2007 | Jansen | 356/495 |
| 2007/0019945 | A1* | 1/2007 | Kurosawa | 396/296 |
| 2008/0316353 | A1* | 12/2008 | Suda | 348/349 |
| 2009/0213233 | A1* | 8/2009 | Kido | 348/208.4 |
| 2011/0103787 | A1* | 5/2011 | Niwamae | 396/463 |
| 2011/0158631 | A1* | 6/2011 | Ono | 396/358 |
| 2011/0158632 | A1* | 6/2011 | Ono | 396/358 |
| 2011/0255857 | A1* | 10/2011 | Okutani | 396/466 |
| 2012/0262807 | A1* | 10/2012 | Togawa | 359/823 |
| 2012/0281134 | A1* | 11/2012 | Okutani | 348/362 |

FOREIGN PATENT DOCUMENTS

| JP | A-03-059635 | 3/1991 |
| JP | A-06-154170 | 6/1994 |
| JP | A-11-305331 | 11/1999 |
| JP | A-2005-134765 | 5/2005 |

OTHER PUBLICATIONS

Japanese Office Action issued in Application No. 2011-155972; Dated Apr. 16, 2013 (With Translation).

* cited by examiner

*Primary Examiner* — Lin Ye
*Assistant Examiner* — John H Morehead, III
(74) *Attorney, Agent, or Firm* — Oliff PLC

(57) ABSTRACT

Provided is a mirror unit comprising a movable mirror that pivots back and forth between an observation position and a withdrawn position; a movable mirror drive section that accumulates bias force using drive force of a drive force source, and causes the movable mirror to pivot from one of the observation position and the withdrawn position to the other by releasing the accumulated bias force; an attachment drive section that accumulates bias force using the drive force of the drive force source, and drives a working section other than the movable mirror by releasing the accumulated bias force; and an interlocking section that interlocks with the movable mirror and the attachment drive section, accumulates bias force in the attachment drive section while the movable mirror drive section releases bias force, and releases bias force from the attachment drive section while the movable mirror drive section accumulates bias force.

10 Claims, 13 Drawing Sheets

MIRROR UNIT AND IMAGE CAPTURING APPARATUS

The contents of the following Japanese patent application are incorporated herein by reference: No. 2011-155972 filed on Jul. 14, 2011.

BACKGROUND

1. Technical Field

The present invention relates to a mirror unit and an image capturing apparatus.

2. Related Art

A drive mechanism is known that accumulates bias force in a biasing material biasing a movable mirror that pivots back and forth, and then releases the bias force when driving the movable mirror to improve the pivoting speed, as shown in Patent Document 1, for example.

Patent Document 1: Japanese Patent Application Publication No. 2005-134765

However, in order to accumulate the energy serving as the drive force while resisting the biasing material, it is necessary to use a drive force source that has a larger output.

SUMMARY

According to a first aspect related to the innovations herein, provided is a mirror unit comprising a movable mirror that pivots back and forth between an observation position and a withdrawn position; a movable mirror drive section that accumulates bias force using drive force of a drive force source, and causes the movable mirror to pivot from one of the observation position and the withdrawn position to the other by releasing the accumulated bias force; an attachment drive section that accumulates bias force using the drive force of the drive force source, and drives a working section other than the movable mirror by releasing the accumulated bias force; and an interlocking section that interlocks with the movable mirror and the attachment drive section, accumulates bias force in the attachment drive section while the movable mirror drive section releases bias force, and releases bias force from the attachment drive section while the movable mirror drive section accumulates bias force.

According to a second aspect related to the innovations herein, provided is an image capturing apparatus comprising the mirror unit described above; a light blocking wall that surrounds a periphery of the movable mirror and limits light incident to the movable mirror; a light blocking plate that moves between an open position at which an opening formed in the light blocking wall is in communication with outside and a closed position at which the light blocking plate blocks the opening; a focus sensor that is disposed outside the light blocking wall and, when the light blocking plate has moved to the open position, is exposed to the movable mirror through the opening; and an image capturing section that captures image light incident to the mirror unit.

Also provided is an image capturing apparatus comprising the mirror unit described above; and an image capturing section that captures image light incident to the mirror unit.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
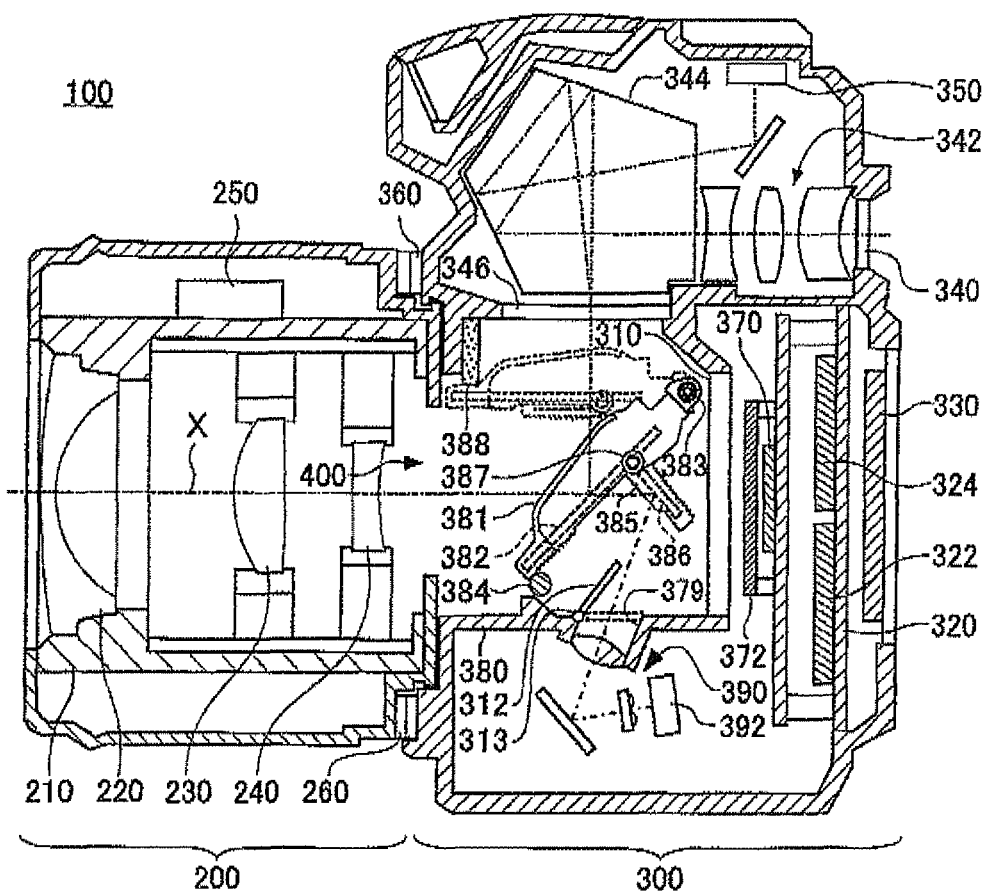
FIG. 1 is a cross-sectional view of a single-lens reflex camera 100.

FIG. 1 is a schematic cross-sectional view of a single-lens reflex camera 100. The single-lens reflex camera 100 includes a lens unit 200 and a camera body 300.

In the following description, the side of the single-lens reflex camera 100 where the lens unit 200 is attached to the camera body 300 is referred to as the "front." The side of the single-lens reflex camera 100 that is opposite the side where the lens unit 200 is attached to the camera body 300 is referred to as the "rear."

The lens unit 200 includes a fixed cylinder 210, lenses 220, 230, and 240, a lens barrel CPU 250, and a lens-side mounting section 260. The lens-side mounting section 260 is disposed at the rear end of the fixed cylinder 210. The lens-side mounting section 260 connects the lens unit 200 to the camera body 300, by interlocking with a body-side mounting section 360 arranged on the front surface of the camera body 300.

The connection between the lens-side mounting section 260 and the body-side mounting section 360 can be dissolved by a predetermined operation. Accordingly, another lens unit 200 including a lens-side mounting section 260 with the same standard can be attached to the camera body 300.

The lenses 220, 230, and 240 are arranged along an optical axis X in the fixed cylinder 210 to form an optical system. Some or all of the lenses 220, 230, and 240 move along the optical axis X. In this way, the focal distance and focal position of the optical system change.

The lens barrel CPU 250 controls the lens unit 200, and also supports communication with the body CPU 322 of the camera body 300. Therefore, the lens unit 200 attached to the camera body 300 operates together with the camera body 300.

In the camera body 300, a mirror unit 401 is arranged behind the lens unit 200, on the side of the body-side mounting section 360 opposite the lens unit 200. The mirror unit 401 includes a main mirror holding frame 381 and a main mirror 382. The main mirror holding frame 381 holds the main mirror 382, and the rear end thereof is axially supported by the main mirror pivoting axle 383.

When the main mirror holding frame 381 pivots in a counterclockwise direction in FIG. 1 to contact a position-fixing pin 384, the main mirror 382 is fixed at an observation position. The main mirror 382 at the observation position is oriented at an angle on the optical axis of image light incident through the optical system of the lens unit 200.

The mirror unit 401 also includes a sub-mirror holding frame 385 and a sub-mirror 386. The sub-mirror holding frame 385 holds the sub-mirror 386 and is supported by the sub-mirror pivoting axle 387 via the main mirror holding frame 381.

Therefore, the sub-mirror 386 pivots relative to the main mirror holding frame 381. When the main mirror holding frame 381 pivots, the sub-mirror 386 and the sub-mirror holding frame 385 move together with the main mirror holding frame 381, and pivot relative to the main mirror holding frame 381.

A portion of the image light incident to the main mirror 382 at the observation position passes through a half-mirror region formed as a portion of the main mirror 382 and becomes incident to the sub-mirror 386 at the observation position. The image light incident to the sub-mirror 386 is reflected toward the focusing optical system 390, and passes through the focusing optical system 390 arranged below the mirror unit 401 to be incident to the focal position sensor 392.

The focal position sensor 392 detects the defocus amount in the optical system of the lens unit 200 and notifies the body CPU 322. The body CPU 322 communicates with the lens barrel CPU 250 to move the lenses 220, 230, and 240 in a manner to cancel out the detected defocus amount. In this way, the lens unit 200 enters a state enabling formation of a subject image made of the subject light on the image capturing surface of the image capturing element 370.

The perimeters of the main mirror 382 and the sub-mirror 386 are surrounded by the focusing screen 346 disposed above, the focal plane shutter 310 disposed behind, and a light blocking wall 380 disposed below the main mirror 382 and the sub-mirror 386. Furthermore, the light blocking wall 380 surrounds the main mirror 382 and the sub-mirror 386 on sides that are deeper and shallower in the view shown in FIG. 1.

As a result, the light incident to the main mirror 382 and the sub-mirror 386 is limited to subject light that has passed through the body-side mounting section 360. The inner surface of the light blocking wall 380 undergoes antireflective processing, and therefore prevents flares or the like in the captured image caused by scattered light in the mirror unit 401.

A light blocking plate 312 is arranged on the bottom surface of the light blocking wall 380. The front edge of the light blocking plate 312 is axially supported by a light blocking plate pivoting axle 313 in a manner to enable pivoting. As shown by the solid lines in FIG. 1, when the light blocking plate 312 is raised and the opening 379 at the bottom of the light blocking wall 380 is opened, the end of the focusing optical system 390 to which light is incident is exposed to the sub-mirror 386. As shown by the dashed lines in FIG. 1, when the light blocking plate 312 is lowered to be horizontal, the light blocking plate 312 closes the opening 379 and conceals the focusing optical system 390 from the sub-mirror 386.

The main mirror 382 at the observation position reflects the majority of incident image light toward the focusing screen 346. The focusing screen 346 is arranged at a position optically conjugate to the image capturing surface of the image capturing element 370, and causes the image formed from the image light by the optical system of the lens unit 200 to be visible.

A pentaprism 344 is arranged further above the focusing screen 346, as seen from the main mirror 382 side. A finder optical system 342 is arranged behind the pentaprism 344. The rear end of the finder optical system 342 is exposed as the finder 340 on the rear surface of the camera body 300.

The subject image created on the focusing screen 346 is observed in the finder 340 via the pentaprism 344 and the finder optical system 342. The subject image observed through the pentaprism 344 appears as a normal image in the finder 340.

A portion of the subject light emitted from the pentaprism 344 is received by a photometric sensor 350 arranged above the finder optical system 342. The photometric sensor 350 detects the brightness and color distribution, for example, of the incident light.

A focal plane shutter 310, an optical filter 372, and an image capturing element 370 are sequentially arranged behind the mirror unit 401 in the stated order. The focal plane shutter 310 includes a front shutter and a rear shutter that open and close independently.

The optical filter 372 is arranged immediately in front of the image capturing element 370, and removes components other than those in the visible light band from the image light incident to the image capturing element 370. The optical filter 372 also protects the surface of the image capturing element 370.

Furthermore, the optical filter 372 decreases the spatial frequency of the image light by serving as a low-pass filter. Therefore, the occurrence of flares when image light having a spatial frequency greater than the Nyquist frequency of the image capturing element 370 is incident to the image capturing element 370 can be restricted.

The image capturing element 370 arranged on the rear surface of the optical filter 372 is formed by a photoelectric conversion element such as a CCD sensor or CMOS sensor. A main substrate 320 and a rear display section 330 are sequentially arranged behind the image capturing element 370 in the stated order. A body CPU 322 and an image processing section 324, for example, are mounted on the main substrate 320. The rear display section 330 is formed by a liquid crystal display board, for example, and is exposed on the rear surface of the camera body 300.

In the single-lens reflex camera 100 described above, image capturing is on standby when the main mirror 382 is in the observation state. Accordingly, the user can determine the image capturing target by observing, in the finder 340, the image formed by the image light passed through the optical system of the lens unit 200.

In this state, when the release button is pressed half-way, the photometric sensor 350 detects the brightness of the subject based on the incident light. The body CPU 322 calculates image capturing conditions such as the diaphragm value, shutter speed, and ISO sensitivity, according to the detected subject brightness.

Therefore, the single-lens reflex camera 100 can enter a state enabling capture of an image of the subject with suitable image capturing conditions. Depending on the operating mode of the single-lens reflex camera 100, there are cases where the release button being pressed half-way provides an opportunity to focus the optical system of the lens unit 200.

When the release button is fully pressed, the main mirror holding frame 381 pivots in a clockwise direction in FIG. 1 along with the main mirror 382 and contacts the shock absorbing material 388, thereby stopping at the image capturing position with a substantially horizontal orientation. The shock absorbing material 388 is formed of an elastic material, and absorbs the impact when contacted by the main mirror holding frame 381. In this way, the main mirror 382 is withdrawn from the optical path of the incident subject light passed through the optical system of the lens unit 200.

When the main mirror 382 pivots toward the image capturing position, the sub-mirror holding frame 385 also rises along with the main mirror holding frame 381, pivots around the sub-mirror pivoting axle 387, and stops at the image capturing position with a substantially horizontal orientation. In this way, the sub-mirror 386 is also withdrawn from the optical path of the subject light.

When the main mirror 382 and the sub-mirror 386 move to the image capturing position, the front shutter of the focal plane shutter 310 in the camera body 300 is opened to create an opening to the optical filter 372. As a result, the incident light passed through the optical system of the lens unit 200 passes through the optical filter 372 to be received by the image capturing element 370.

When the image capturing is finished, the rear shutter of the focal plane shutter 310 blocks the picture frame, and the main mirror 382 and sub-mirror 386 return to the observation position. In this way, the main mirror 382 and the sub-mirror 386 pivot back and forth between the observation position and the image capturing position.

The image capturing position of the main mirror 382 is located above the observation position in FIG. 1. Accordingly, the operation of the main mirror 382 pivoting from the observation position to the image capturing position can be referred to as "raising." For the same reason, the operation of the main mirror 382 moving from the image capturing position to the observation position can be referred to as "lowering."

The light blocking plate 312 also pivots back and force according to the pivoting of the main mirror 382 described above. In other words, when the main mirror 382 is at the observation position, the fight blocking plate 312 is at an open position and one end of the focusing optical system 390 inside the opening 379 is exposed. Accordingly, as described above, the focal position sensor 392 is activated and the optical system of the lens unit 200 can be focused.

On the other hand, when the main mirror 382 is at the image capturing position, the light blocking plate 312 pivots to a closed position. Therefore, the incident end of the focusing optical system 390 is concealed from the image light in the mirror unit 401. Accordingly, the image light is prevented from being scattered by the focusing optical system 390 and affecting the captured image.

Figure 2:
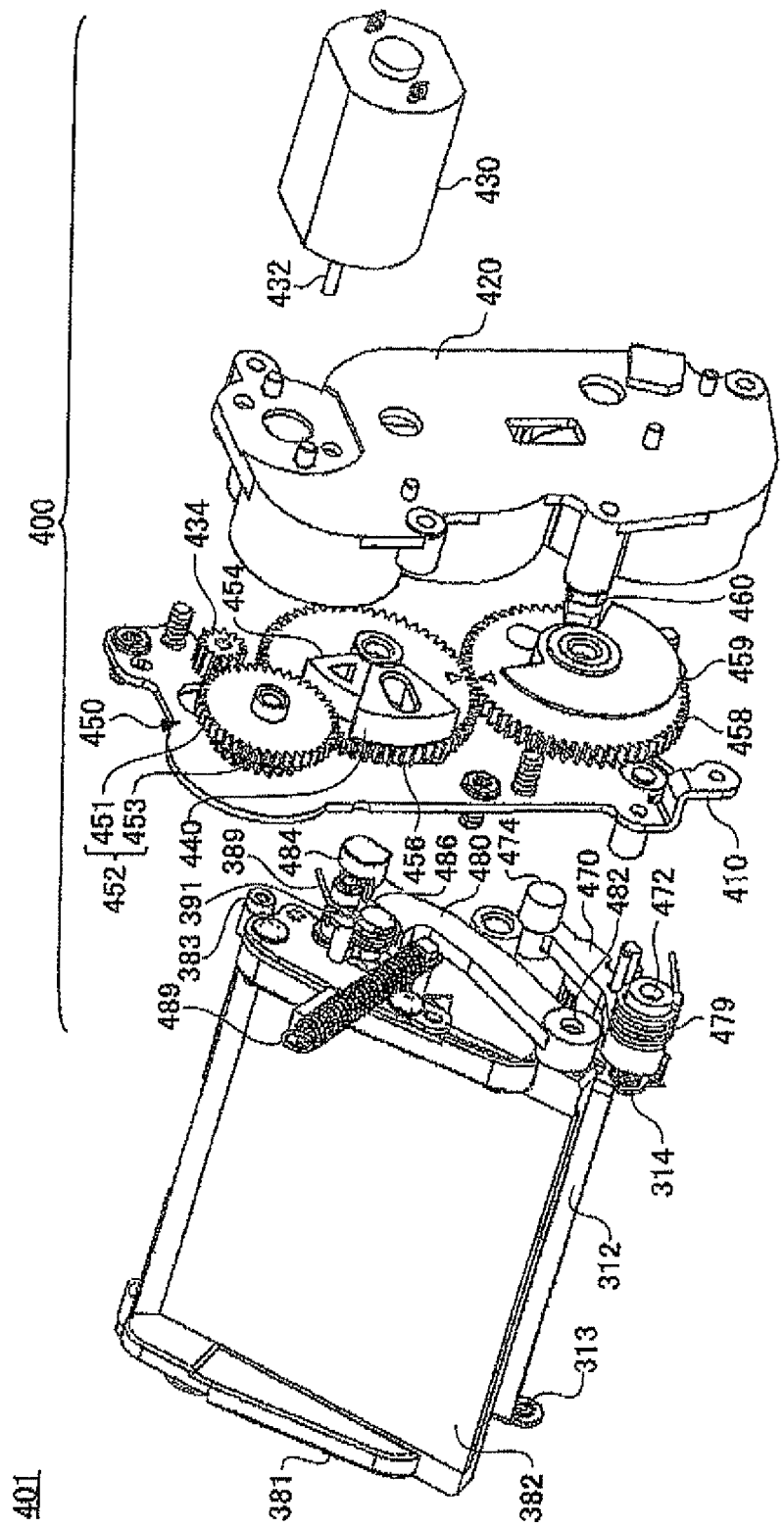
FIG. 2 is an exploded partial perspective view of a mirror unit 401.

FIG. 2 is a perspective view of a portion of the mirror unit 401, and shows the mirror unit 401 as seen diagonally from the front of the single-lens reflex camera 100. In FIG. 2, components that are the same as those in FIG. 1 are given the same reference numerals and redundant explanations are omitted.

The mirror unit 401 includes a drive section 400 that was not shown in the cross section of FIG. 1, in addition to the main mirror holding frame 381, the main mirror 382, the light blocking plate 312, and the like shown in FIG. 1. The drive section 400 is located at a shallower position than the plane of FIG. 1, and is located on the main mirror 382 side.

The drive section 400 includes a rotation actuator 430, a gear train 450, a mirror drive lever 480, and a light blocking plate drive lever 470. The rotation actuator 430 can rotate the drive axle 432 in a normal direction or a reverse direction, according to the polarity of the supplied drive voltage. A pinion gear 434 is attached to the front end of the drive axle 432, and transmits the rotational drive force to the outside.

The gear train 450 includes a medium-diameter gear 452, a mirror drive gear 456, and an attachment drive gear 458. The medium-diameter gear 452, the mirror drive gear 456, and the attachment drive gear 458 are axially supported by the drive section frame 410 formed of sheet metal, via a rotating axle parallel to the drive axle 432.

The medium-diameter gear 452 includes a large-diameter gear 451 having a large number of teeth and a small-diameter gear 453 having a small number of teeth, and the medium-diameter gear 452 and small-diameter gear 453 are formed integrally and coaxially. The rotational drive force of the drive axle 432 is transmitted to the large-diameter gear 451 from the pinion gear 434.

The small-diameter gear 453 engages with the mirror drive gear 456, and the mirror drive gear 456 engages with the attachment drive gear 458. Accordingly, the rotation of the medium-diameter gear 452 is sequentially transmitted to the mirror drive gear 456 and the attachment drive gear 458. The rotational drive force causes slower rotation of the medium-diameter gear 452, and therefore the mirror drive gear 456 and the attachment drive gear 458 are driven with a large torque.

Here, the mirror drive gear 456 and the attachment drive gear 458 engage directly with each other. Accordingly, the mirror drive gear 456 and the attachment drive gear 458 rotate together. Furthermore, the mirror drive gear 456 and the attachment drive gear 458 have opposite rotational directions.

The mirror drive gear 456 includes a bumper 454 shaped as a sector protruding from the side surface of the mirror drive gear 456, and the bumper 454 is formed integrally with the mirror drive gear 456. A stopper 440 shaped as a sector coaxial with the bumper 454 is arranged on the side of the mirror drive gear 456. The stopper 440 is fixed to a cover 420.

Accordingly, the mirror drive gear 456 regulates rotation when the bumper 454 is in contact with the stopper 440. Therefore, the mirror drive gear 456 pivots back and forth between a position in which the bumper 454 contacts the top surface of the stopper 440 in FIG. 2 and a position where the bumper 454 contacts the bottom surface of the stopper 440 in FIG. 2. The attachment drive gear 458 engages and moves together with the mirror drive gear 456, and therefore the attachment drive gear 458 also moves back and forth in the range that the mirror drive gear 456 can rotate.

The attachment drive gear 458 includes a detection plate 459 that is arranged coaxially with the attachment drive gear 458 and distanced from the attachment drive gear 458 in the direction of the rotational axis. The detection plate 459 is shaped as a sector and blocks the detection light of the photointerrupter 460 arranged behind the attachment drive gear 458, except at regions near the ends of the pivoting range. Accordingly, meaningless power consumption can be prevented by blocking the supply of drive current to the rotation actuator 430 when the photointerrupter 460 detects the detection light.

The gear train 450 including the pinion gear 434, the medium-diameter gear 452, the mirror drive gear 456, and the attachment drive gear 458 is housed in a cover 420 that forms a chassis together with the drive section frame 410. The rotation actuator 430 is fixed to the outer surface of the cover 420.

The light blocking plate drive lever 470 is arranged on a side of the light blocking plate 312 and oriented in the front to rear direction of the single-lens reflex camera 100. The front end of the light blocking plate drive lever 470 is supported by the lever pivoting axle 472 that is parallel to the light blocking plate pivoting axle 313. A cam follower 474 that receives the drive force from a cam arranged thereabove is provided on the top surface at the rear end of the light blocking plate drive lever 470 in FIG. 2.

The light blocking plate drive lever 470 is biased in a direction to pivot counterclockwise in FIG. 2 around the lever pivoting axle 472, by a light blocking plate drive spring 479 attached around the lever pivoting axle 472. The light blocking plate 312 is biased in a direction to pivot counterclockwise and become open in FIG. 2, by a light blocking plate bias spring 314 attached to the light blocking plate pivoting axle 313.

The mirror drive lever 480 is arranged on a side of the main mirror holding frame 381 and oriented in the front to rear direction of the single-lens reflex camera 100. The front end of the mirror drive lever 480 is axially supported by the lever pivoting axle 482 parallel to the main mirror pivoting axle 383. A cam follower 484 that receives the drive force from a cam arranged thereabove is provided on the top surface at the rear end of the mirror drive lever 480 in FIG. 2.

The mirror drive lever 480 is biased in a direction to rotate counterclockwise around the lever pivoting axle 482 in FIG. 2, by a mirror drive spring 489. The main mirror holding frame 381 includes a mirror drive pin 391 that protrudes from the side surface of the main mirror holding frame 381 in a direction parallel to the main mirror pivoting axle 383.

The mirror drive pin 391 engages with the mirror drive lever 480 via a drive force transmitting section 486 disposed on the mirror drive lever 480 adjacent to the cam follower 484. The mirror bias spring 389 attached to the mirror drive pin 391 biases the main mirror holding frame 381 to pivot counterclockwise in FIG. 2, which is a direction causing the main mirror 382 to be lowered.

Accordingly, when the main mirror holding frame 381 does not receive a drive force from the mirror drive lever 480, the main mirror holding frame 381 pivots counterclockwise in FIG. 2 according to the bias force of the mirror bias spring 389 to lower the main mirror 382 toward the observation position. As a result, the mirror drive pin 391 presses down on the mirror drive lever 480 via the drive force transmitting section 486.

However, when the bias force of the mirror drive spring 489 acts on the mirror drive lever 480, the mirror drive spring 489 overpowers the bias force of the mirror bias spring 389 and causes the mirror drive lever 480 to pivot clockwise in FIG. 2. Therefore, the mirror drive pin 391 is pressed up by the drive force transmitting section 486, and the main mirror holding frame 381 pivots clockwise in FIG. 2. In other words, the mirror drive spring 489 has a bias force that works against the bias force of the mirror bias spring 389 and causes the mirror drive lever 480 to pivot.

Figure 3:
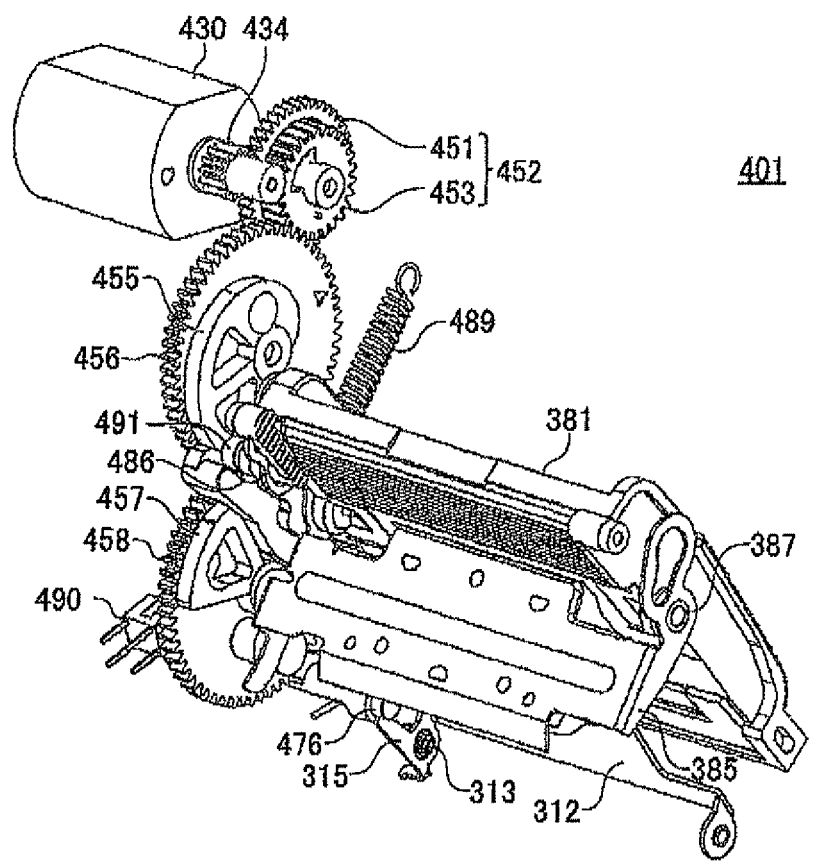
FIG. 3 is a partial perspective view of the mirror unit 401.

FIG. 3 is a perspective view of a portion of the mirror unit 401, and shows the mirror unit 401 as seen diagonally from the rear of the single-lens reflex camera 100. In FIG. 3, components that are the same as those in FIGS. 1 and 2 are given the same reference numerals and redundant explanations are omitted.

In contrast to the state shown in FIG. 2, a mirror drive cam 455 is arranged on the back surface of the mirror drive gear 456. The mirror drive cam 455 includes a cam profile having a logarithmic spiral shape centered on the rotational axis of the mirror drive gear 456. Accordingly, in response to rotation of the mirror drive gear 456, the gap in the radial direction between the rotating axle of the mirror drive gear 456 and the front surface of the cam profile changes.

The cam follower 474 formed on the end of the mirror drive lever 480 contacts the mirror drive cam 455 formed on the mirror drive gear 456 from below. Accordingly, when the mirror drive gear 456 pivots and the gap between the cam profile and the rotating axle increases, the cam follower 474 is pushed down from above.

In contrast, the drive force transmitting section 486 of the mirror drive lever 480 contacts the mirror drive pin 391 of the main mirror holding frame 381 from below. Accordingly, the mirror drive lever 480 works against the bias force of the mirror bias spring 389 to drive the main mirror holding frame 381 in a manner to raise the main mirror holding frame 381.

Accordingly, when the mirror drive gear 456 pivots in a direction that gradually increases the diameter of the mirror drive cam 455, the cam follower 484 of the mirror drive lever 480 is pressed downward. As a result, the mirror drive lever 480 pivots against the bias force of the mirror drive spring 489. Furthermore, when the mirror drive gear 456 pivots in a direction that gradually decreases the diameter of the mirror drive cam 455, the mirror drive lever 480 pivots according to the bias force of the mirror drive spring 489.

FIG. 3 shows the light blocking plate 312 including a light blocking plate engaging lever 315 that protrudes radially from the periphery of the light blocking plate pivoting axle 313. Furthermore, the light blocking plate engaging lever 315 is shown engaged with the light blocking plate drive pin 476. Yet further, the attachment drive cam 457 is shown disposed on the side surface of the attachment drive gear 458.

The attachment drive cam 457 includes a cam profile resembling the mirror drive cam 455. The cam follower 474 of the light blocking plate drive lever 470 is positioned below the attachment drive cam 457. Accordingly, when the attachment drive gear 458 pivots to increase the diameter of the attachment drive cam 457, the cam profile contacts the top surface of the cam follower 474.

Furthermore, when the attachment drive gear 458 pivots in a direction that gradually increases the diameter of the attachment drive cam 457, the cam follower 474 of the light blocking plate drive lever 470 is pressed down. As a result, the light blocking plate drive lever 470 pivots against the bias force of the light blocking plate drive spring 479.

When the attachment drive gear 458 pivots in a direction that gradually decreases the diameter of the attachment drive cam 457, the light blocking plate drive lever 470 pivots according to the bias force of the light blocking plate drive spring 479. In this way, the attachment drive gear 458 and the attachment drive cam 457 drive the light blocking plate drive lever 470 and the light blocking plate 312 attached to the mirror unit 401 as working parts.

Figure 4:
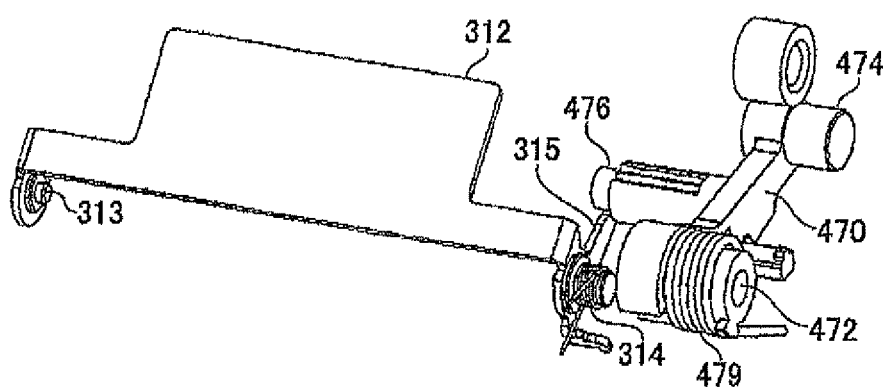
FIG. 4 is a perspective view of the region around the light blocking plate 312.

FIG. 4 is a perspective view showing the light blocking plate 312 and the light blocking plate drive lever 470 in an extracted state, as seen diagonally from the front of the single-lens reflex camera 100. In FIG. 4, components that are the same as those in FIGS. 1 to 3 are given the same reference numerals and redundant explanations are omitted.

As shown in FIG. 4, the light blocking plate drive pin 476 protrudes from the light blocking plate drive lever 470 toward the center of the light blocking plate 312, in a direction parallel to the lever pivoting axle 472. The tip of the light blocking plate drive pin 476 contacts the light blocking plate engaging lever 315 from above.

The light blocking plate 312 is biased by the light blocking plate bias spring 314 in a direction to be raised up and opened. In contrast, the light blocking plate drive pin 476 causes the light blocking plate 312 to pivot against the bias force of the light blocking plate bias spring 314 to lower the light blocking plate engaging lever 315, thereby providing drive in a direction to close the light blocking plate 312.

Figure 5:
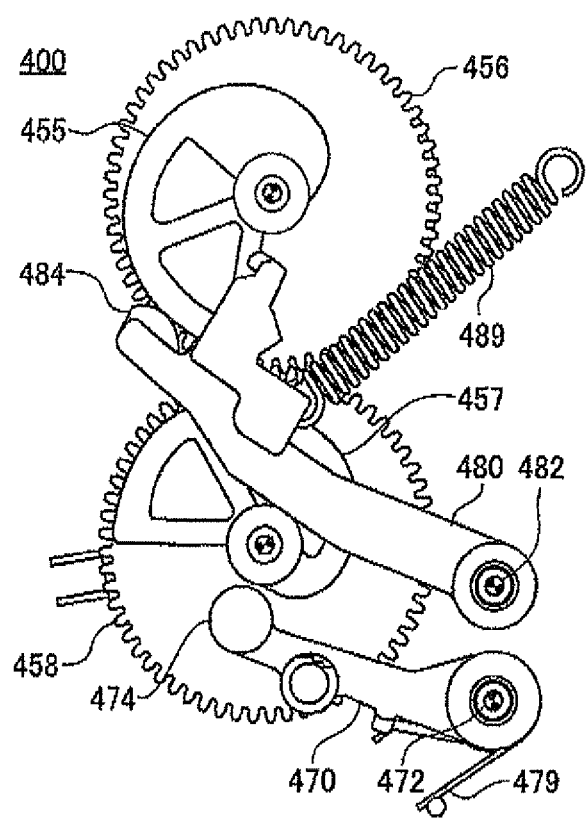
FIG. 5 is used to describe operation of a drive section 400.

FIG. 5 is a perspective view of the drive section 400 showing the positional relationship between the mirror drive gear 456, the attachment drive gear 458, the light blocking plate drive lever 470, and the mirror drive lever 480. FIG. 5 shows the drive section 400 as seen from the main mirror 382 side.

Components that are the same as those of the mirror unit 401 in FIGS. 1 to 4 are given the same reference numerals and redundant explanations are omitted.

FIG. 5 corresponds to the state represented by the solid lines in FIG. 1. In other words, in the mirror unit 401, the main mirror 382 is at the observation position. Accordingly, the main mirror 382 is disposed at an angle relative to the light incident to the camera body 300. Furthermore, the light blocking plate 312 is at the open position, and the focusing optical system 390 is exposed to the light blocking wall 380 on the main mirror 382 side.

At this time, the mirror drive lever 480 has just reached the end of the pivoting range in the counterclockwise direction in FIG. 5. The mirror drive spring 489 is extended, and accumulates the maximum amount of elastic energy within the operating period of the mirror drive gear 456. Therefore, the main mirror holding frame 381 is lowered against the bias force of the mirror bias spring 389, and reaches the observation position at which the main mirror holding frame 381 contacts the position-fixing pin 384.

The bias force of the extended mirror drive spring 489 is held by the mirror drive cam 455 pressing the cam follower 484 of the mirror drive lever 480. Therefore, the cam follower 484 contacts a portion of the mirror drive cam 455 having a large diameter.

On the other hand, the light blocking plate drive lever 470 is at the end of the pivoting range in the clockwise direction in FIG. 5. The light blocking plate drive spring 479 has released the bias force.

The released bias force of the light blocking plate drive spring 479 causes the light blocking plate drive lever 470 to pivot clockwise in FIG. 5, thereby raising the cam follower 474. It should be noted that the portion of the cam profile with the smallest diameter of the attachment drive cam 457 faces the cam follower 484, and the cam follower 484 is distanced from the cam profile of the attachment drive cam 457.

In this way, in the mirror unit 401, the attachment drive gear 458 and the attachment drive cam 457 drive the light blocking plate drive lever 470 and the light blocking plate 312 attached to the mirror unit 401 as working parts.

Figure 6:
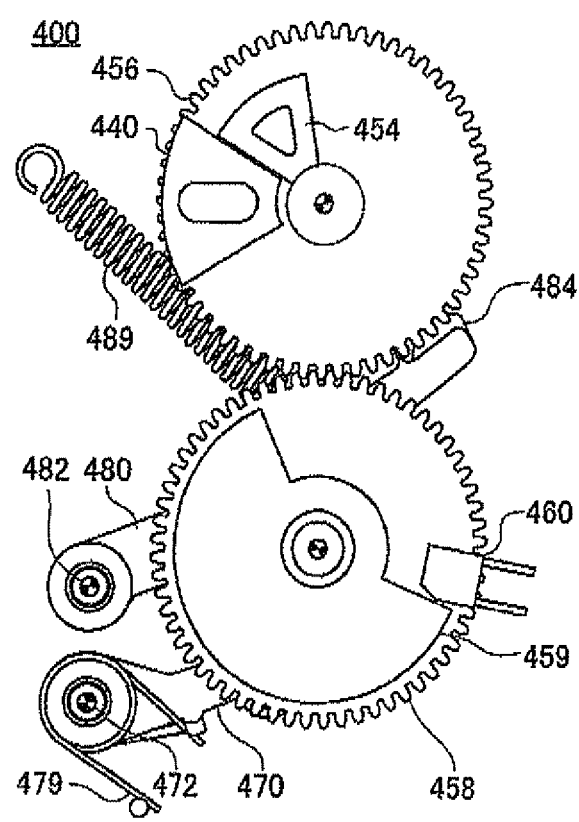
FIG. 6 shows operation of the drive section 400 as seen from another surface of a gear train 450.

FIG. 6 shows the drive section 400 in the state shown in FIG. 5 as seen from the side opposite the main mirror 382. Components that are the same as those in FIG. 5 are given the same reference numerals and redundant explanations are omitted.

In the state shown in FIG. 6, on the back surface of the mirror drive gear 456, the bumper 454 contacts the top surface of the stopper 440. Accordingly, the mirror drive gear 456 does not pivot in the counterclockwise direction beyond the state shown in FIG. 5.

Furthermore, on the back surface of the attachment drive gear 458, the detection plate 459 is removed from the photointerrupter 460, and therefore the photointerrupter 460 detects the detection light. In this way, when the bumper 454 contacts the stopper 440, the power consumption can be restricted and overload of the drive section 400 can be prevented by stopping the supply of drive current to the rotation actuator 430 in response to the photointerrupter 460 detecting the detection light.

Figure 7:
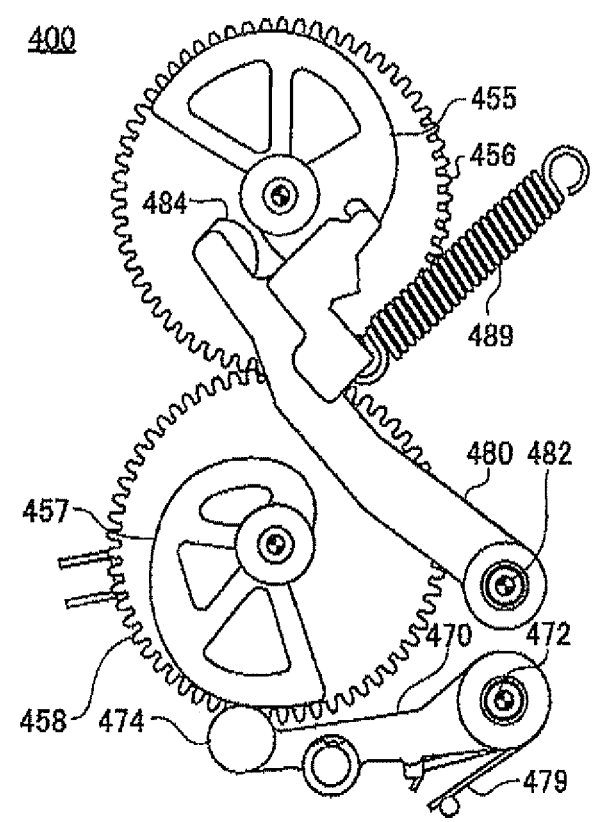
FIG. 7 is used to describe operation of the drive section 400.

FIG. 7 shows the operation of the drive section 400 from the same point of view as used in FIG. 5. Components that are the same as those in FIGS. 5 and 6 are given the same reference numerals and redundant explanations are omitted.

FIG. 7 corresponds to the state shown by the dotted lines in FIG. 1. In other words, in the mirror unit 401, the main mirror 382 is at the image capturing position, and the focusing optical system 390 is concealed from the main mirror 382 side by the light blocking plate 312 at the closed position.

At this time, the mirror drive lever 480 is at the end of the pivotal range in the clockwise direction in FIG. 7. The mirror drive spring 489 is in a compressed state after having released a bias force.

The released bias force of the mirror drive spring 489 causes the mirror drive lever 480 to pivot clockwise in FIG. 7, thereby raising the cam follower 484. It should be noted that the portion of the cam profile with the smallest diameter of the mirror drive cam 455 faces the cam follower 474, and the cam follower 474 is distanced from the cam profile of the mirror drive cam 455.

On the other hand, the light blocking plate drive lever 470 is at the end of the pivoting range in the counterclockwise direction in FIG. 7. One end of the light blocking plate drive spring 479 is drawn near the light blocking plate drive lever 470 and therefore accumulates a bias force. As a result, the light blocking plate 312 is lowered against the bias force of the light blocking plate bias spring 314, thereby closing the bottom surface of the light blocking wall 380 and concealing the focusing optical system 390.

The bias force accumulated in the light blocking plate drive spring 479 is held by the attachment drive cam 457 pressing the cam follower 474 of the light blocking plate drive lever 470. Therefore, the cam follower 474 contacts a portion of the attachment drive cam 457 having a large diameter.

Figure 8:
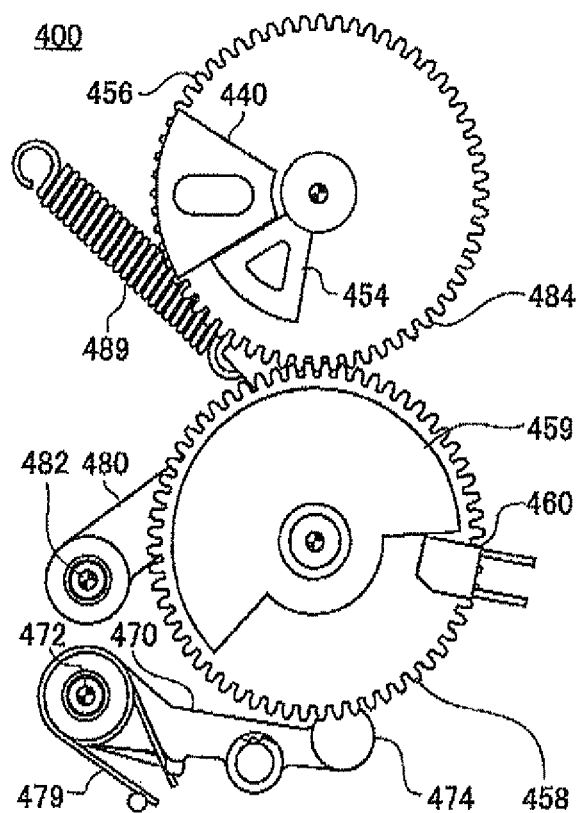
FIG. 8 shows operation of the drive section 400 as seen from another surface of the gear train 450.

FIG. 8 shows the drive section 400 in the state shown in FIG. 7 as seen from the side opposite the main mirror 382. Components that are the same as those in FIG. 7 are given the same reference numerals and redundant explanations are omitted.

In the state shown in FIG. 8, on the back surface of the mirror drive gear 456, the bumper 454 contacts the bottom surface of the stopper 440. Accordingly, the mirror drive gear 456 does not pivot in the clockwise direction beyond the state shown in FIG. 7.

Furthermore, on the back surface of the attachment drive gear 458, the detection plate 459 is removed from the photointerrupter 460, and therefore the photointerrupter 460 detects the detection light. In this way, when the bumper 454 contacts the stopper 440, the power consumption can be restricted and overload of the drive section 400 can be prevented by stopping the supply of drive current to the rotation actuator 430 in response to the photointerrupter 460 detecting the detection light.

Figure 9:
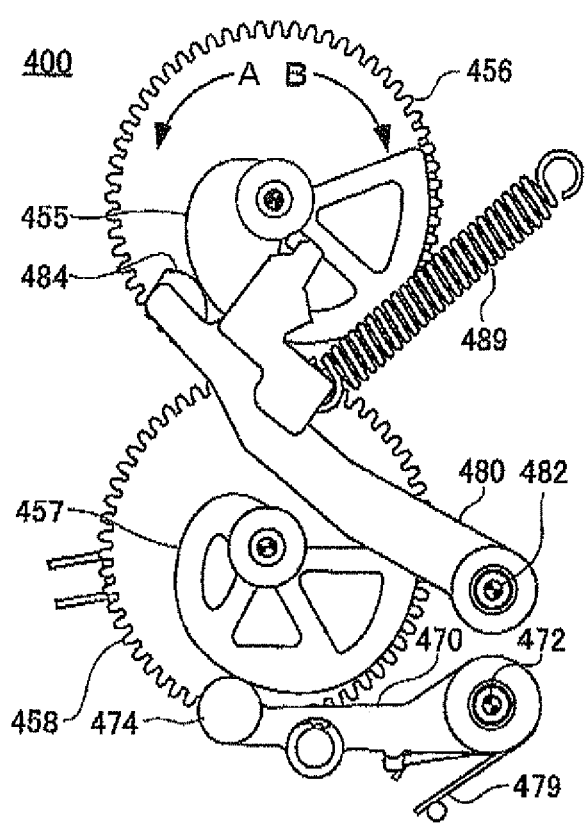
FIG. 9 is used to describe operation of the drive section 400.

FIG. 9 shows the operation of the drive section 400 from the same point of view as used in FIGS. 5 and 7. Components that are the same as those in FIGS. 5 to 8 are given the same reference numerals and redundant explanations are omitted.

FIG. 9 corresponds to a state between the state shown in FIG. 5 and the state shown in FIG. 7. It should be noted that the state shown in FIG. 9 represents both a state when the main mirror 382 is moved from the observation position to the image capturing position and a state when the main mirror 382 is moved from the image capturing position to the observation position.

In the mirror unit 401, when the main mirror 382 is moved from the observation position to the image capturing position, i.e. when the drive section 400 transitions from the state shown in FIG. 5 to the state shown in FIG. 7, the mirror drive gear 456 pivots counterclockwise in FIG. 9 as shown by the arrow A.

When the mirror drive gear 456 pivots counterclockwise in FIG. 9, the diameter of the cam profile contacting the cam follower 484 of the mirror drive lever 480 gradually decreases according to the pivoting of the mirror drive gear 456. Therefore, the cam follower 484 is raised and the mirror drive lever 480 rotates clockwise in FIG. 9 as the bias force of the mirror drive spring 489 is gradually released. Accordingly, the main mirror holding frame 381 presses the mirror drive pin 391 upward, and rises toward the image capturing position against the bias force of the mirror bias spring 389.

Furthermore, when the mirror drive gear 456 pivots counterclockwise, the attachment drive gear 458 pivots clockwise in conjunction. As a result, the diameter of the cam profile contacting the cam follower 474 of the light blocking plate drive lever 470 gradually increases according to the pivoting of the attachment drive gear 458.

Accordingly, the cam follower 474 is pressed downward against the bias force of the light blocking plate drive spring 479, and the light blocking plate drive pin 476 presses down on the light blocking plate engaging lever 315. As a result, the light blocking plate 312 moves to the closed position against the bias force of the light blocking plate bias spring 314, thereby concealing the focusing optical system 390.

In this way, when the main mirror 382 moves from the observation position to the image capturing position, the mirror drive lever 480 causes the main mirror holding frame 381 to pivot due to the bias force released by the mirror drive spring 489. Furthermore, when the mirror drive gear 456 pivots to raise the main mirror 382, the light blocking plate drive lever 470 closes the light blocking plate 312 while storing bias force in the light blocking plate drive spring 479. Accordingly, the bias force released by the mirror drive spring 489 decreases the load on the rotation actuator 430 that accumulates the bias force in the light blocking plate drive spring 479.

In other words, the load placed on the rotation actuator 430 is restricted, and therefore a rotation actuator 430 with a smaller output can be used. Therefore, the mirror unit 401 can be made smaller, quieter, and less expensive.

Furthermore, in the mirror unit 401, when the main mirror 382 moves from the image capturing position to the observation position, i.e. when the drive section 400 transitions from the state shown in FIG. 7 to the state shown in FIG. 5, the mirror drive gear 456 moves clockwise in FIG. 9 as shown by the arrow B.

When the mirror drive gear 456 pivots clockwise in FIG. 9, the diameter of the cam profile contacting the cam follower 484 of the mirror drive lever 480 gradually decreases according to the mirror drive gear 456. As a result, the cam follower 484 is lowered and the mirror drive lever 480 pivots counterclockwise in FIG. 9 while storing bias force in the mirror drive spring 489. Accordingly, the main mirror holding frame 381 is lowered toward the observation position by the bias force of the mirror bias spring 389.

When the mirror drive gear 456 pivots clockwise in FIG. 9, the attachment drive gear 458 pivots counterclockwise in conjunction. As a result, the diameter of the cam profile contacting the earn follower 474 of the light blocking plate drive lever 470 gradually decreases according to the pivoting of the attachment drive gear 458.

Accordingly, the cam follower 474 is raised as the bias force of the light blocking plate drive spring 479 is released. As a result, the light blocking plate 312 opens the opening 379 due to the bias force of the light blocking plate bias spring 314, thereby exposing the focusing optical system 390 to the sub-mirror 386.

In this way, when the main mirror 382 moves from the observation position to the image capturing position, the light blocking plate drive lever 470 accumulates the bias force of the light blocking plate drive spring 479 while the mirror drive lever 480 releases the bias force of the mirror drive spring 489. The mirror drive gear 456 that drives the mirror drive lever 480 and the attachment drive gear 458 that drives the light blocking plate drive lever 470 interlock with each other to operate in conjunction, and therefore the load on the rotation actuator 430 that accumulates the bias force in the light blocking plate drive spring 479 is decreased by the bias force released by the mirror drive spring 489.

Furthermore, when the main mirror 382 moves from the image capturing position to the observation position, the light blocking plate drive lever 470 releases the bias force of the light blocking plate drive spring 479 while the mirror drive lever 480 accumulates the bias force of the mirror drive spring 489. Accordingly, due to the light blocking plate drive lever 470 and the attachment drive gear 458 being interlocked and operating together, the load of the rotation actuator 430 that accumulates bias force in the mirror drive spring 489 is decreased by the bias force released by the light blocking plate drive spring 479.

In other words, the load placed on the rotation actuator 430 is restricted, and therefore a rotation actuator 430 with a smaller output can be used. Therefore, the mirror unit 401 can be made smaller, quieter, and less expensive.

Figure 10:
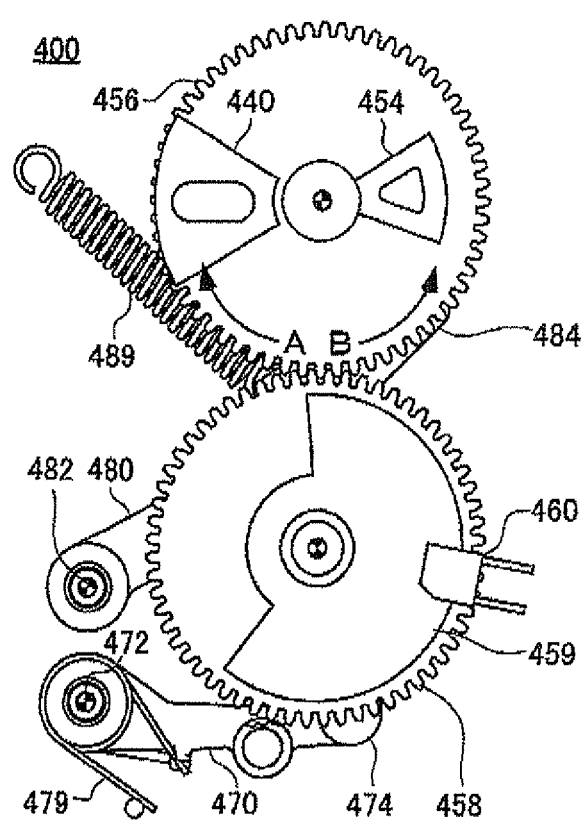
FIG. 10 shows operation of the drive section 400 as seen from another surface of the gear train 450.

FIG. 10 shows the drive section 400 in the state shown in FIG. 9, as seen from the side opposite the main mirror 382. Components that are the same as those in FIG. 9 are given the same reference numerals, and redundant explanations are omitted.

In the state shown in FIG. 9, on the back surface of the mirror drive gear 456, the bumper 454 is distanced from the top surface and bottom surface of the stopper 440. Accordingly, the mirror drive gear 456 can pivot without being blocked by the stopper 440.

Furthermore, on the back surface of the attachment drive gear 458, the detection plate 459 blocks the photointerrupter 460. Accordingly, the photointerrupter 460 does not detect the detection light. Therefore, the drive power can be supplied to the rotation actuator 430 to achieve normal or reverse pivoting.

Figure 11:
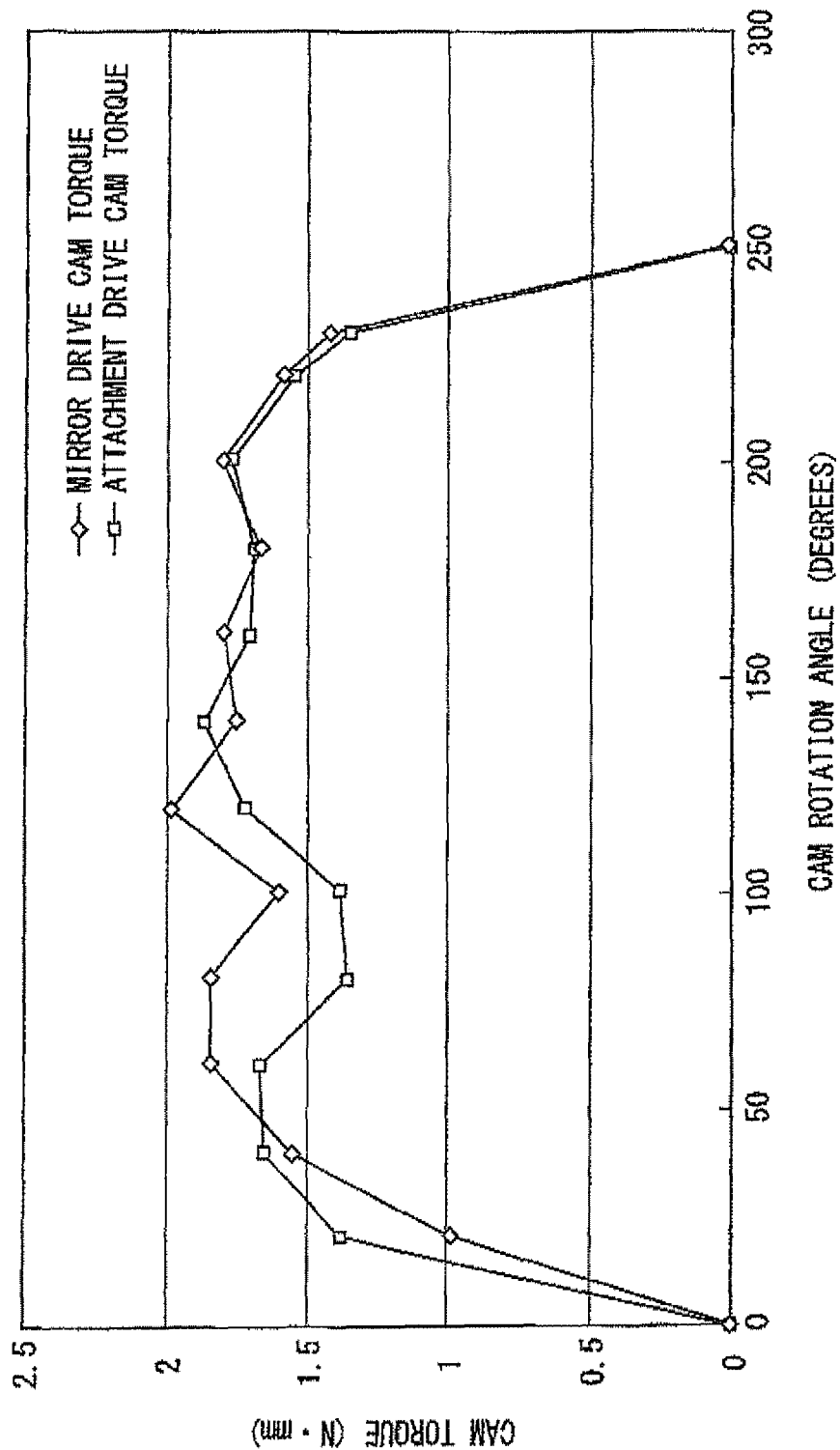
FIG. 11 is a graph showing a relationship between cam rotation angle and cam torque.

FIG. 11 is a graph showing a comparison between cam torque and angle of rotation in the mirror drive cam 455 and the attachment drive cam 457. The mirror drive cam 455 is used to drive various components, such as the main mirror holding frame 381, the main mirror 382, the sub-mirror holding frame 385, and the sub-mirror 386. The attachment drive cam 457 drives only the light blocking plate 312. Accordingly, the amount of work demanded of the drive section 400 differs depending on what component is being driven.

However, in the drive section 400 including the mirror unit 401, the light blocking plate drive spring 479 and the mirror drive spring 489 store and release bias force in a complementary manner. Therefore, the cam torque of the mirror drive cam 455 and the cam torque of the attachment drive cam 457 are preferably balanced by adjusting the lever ratios of the light blocking plate drive lever 470 and the mirror drive lever 480 or the strengths of the light blocking plate drive spring 479 and the mirror drive spring 489, for example.

Therefore, as an example, the profile of the mirror drive cam 455 may first be determined such that the mirror drive cam 455 efficiently accumulates elastic energy in the mirror drive spring 489. Next, the lever ratio of the light blocking plate drive lever 470 and the strength of the light blocking plate drive spring 479 may be adjusted such that the cam torque occurring in the attachment drive cam 457 is similar to the cam torque occurring in the mirror drive cam 455. In this way, when elastic energy is accumulated in the mirror drive spring 489 or the light blocking plate drive spring 479, the rotation actuator 430 can be operated efficiently.

Figure 12:
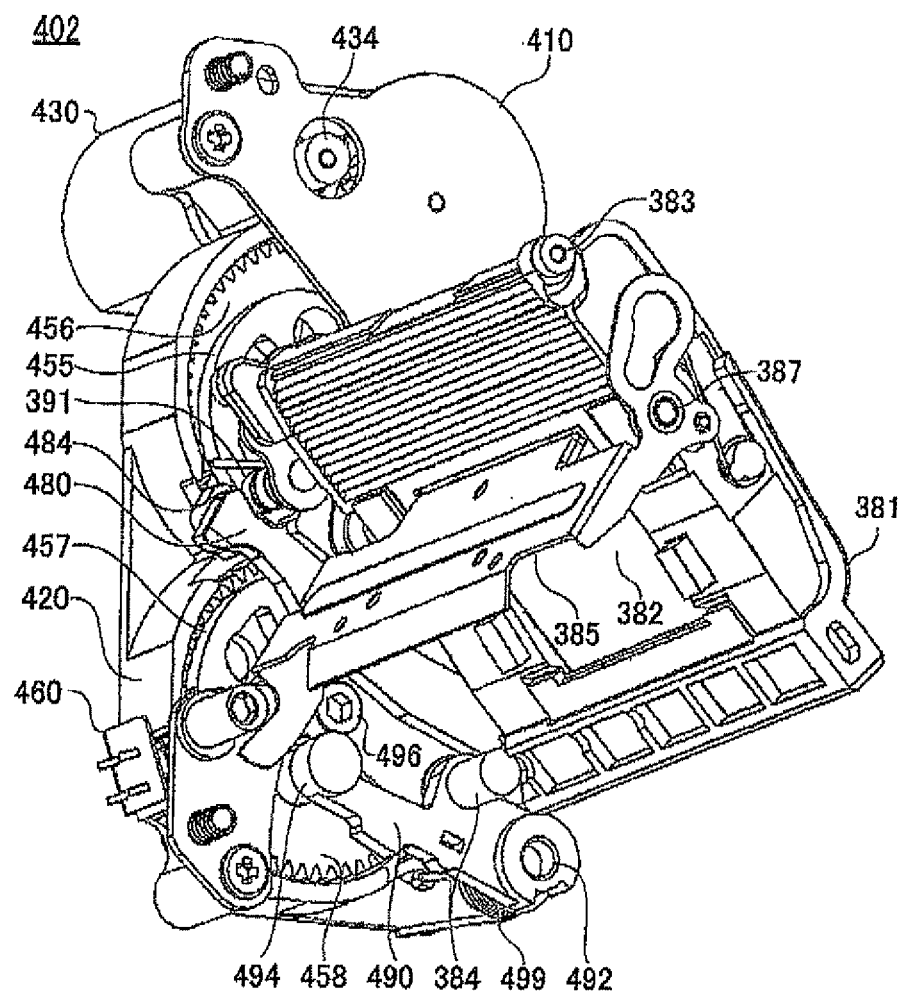
FIG. 12 is a partial perspective view of a mirror unit 402.

FIG. 12 is a perspective view of a portion of a mirror unit 402 having another configuration, as seen diagonally from the rear. Aside from the points described below, the mirror unit 402 has the same configuration as the mirror unit 401. FIG. 12 shows a state in which the cam follower 484 of the mirror drive lever 480 is fully lowered and the main mirror 382 is at the observation position, in the same manner as in FIG. 5. Therefore, identical components are given the same reference numerals, and redundant explanations are omitted.

The mirror unit 402 includes a position-fixing pin drive lever 490, which replaces the light blocking plate drive lever 470 and the light blocking plate 312 of the mirror unit 401. The position-fixing pin drive lever 490 is driven by the attachment drive gear 458 and the attachment drive cam 457, as an attachment that is attached to the mirror unit 402.

One end of the position-fixing pin drive lever 490 is supported by the drive section frame 410 to enable pivoting around the lever pivoting axle 492 parallel to the main mirror pivoting axle 383, in the same manner as the light blocking plate drive lever 470. The position-fixing pin drive lever 490 is biased in a clockwise direction in FIG. 12, by a position-fixing pin drive spring 499 that is attached to the periphery of the lever pivoting axle 492.

The other end of the position-fixing pin drive lever 490 includes a cam follower 494 formed integrally with the position-fixing pin drive lever 490. The cam follower 494 contacts the attachment drive cam 457, which is formed integrally with the attachment drive gear 458, from below in FIG. 12. The position-fixing pin drive lever 490 is biased by the position-fixing pin drive spring 499, and therefore the cam follower 494 is pressed by the cam profile surface of the attachment drive cam 457.

Furthermore, when the main mirror 382 is at the observation position, the cam follower 494 of the position-fixing pin drive lever 490 faces the attachment drive cam 457 at a portion thereof where the cam profile has a small diameter. When the position-fixing pin drive lever 490 has pivoted clockwise in FIG. 12 as much as possible, the cam follower 494 contacts the eccentric pin 496. Accordingly, the position at which the position-fixing pin drive lever 490 stops is defined by the position on the circumferential surface of the eccentric pin 496.

The eccentric pin 496 can pivot around a pivotal axis that is skewed from the center of the cylindrical circumferential surface, or can be fixed. Accordingly, the stopping position of the position-fixing pin drive lever 490 can be adjusted by pivoting of the eccentric pin 496 to displace the circumferential surface.

Furthermore, a position-fixing pin 384 is arranged on the position-fixing pin drive lever 490 between the lever pivoting axle 492 and the cam follower 494. The position-fixing pin 384 protrudes from the side surface of the position-fixing pin drive lever 490 toward the inside of the mirror unit 402, in a direction parallel to the main mirror pivoting axle 383.

The position-fixing pin 384 is formed integrally with the position-fixing pin drive lever 490, and when the position-fixing pin drive lever 490 pivots around the lever pivoting axle 492, the position-fixing pin 384 rises and falls according to the pivoting amount of the position-fixing pin drive lever 490. Therefore, the position-fixing pin 384 moves into and out of the optical path of the image light incident to the mirror unit 402.

In this way, when the main mirror holding frame 381 is lowered and the main mirror 382 is in the observation position, the position-fixing pin drive lever 490 is biased to pivot clockwise in FIG. 12 due to the bias force of the position-fixing pin drive spring 499, and stops when the cam follower 494 contacts the eccentric pin 496. Therefore, the position-fixing pin 384 is in the optical path of the image light at a position adjusted in advance by the eccentric pin 496, thereby defining the stopping position of the main mirror holding frame 381.

Figure 13:
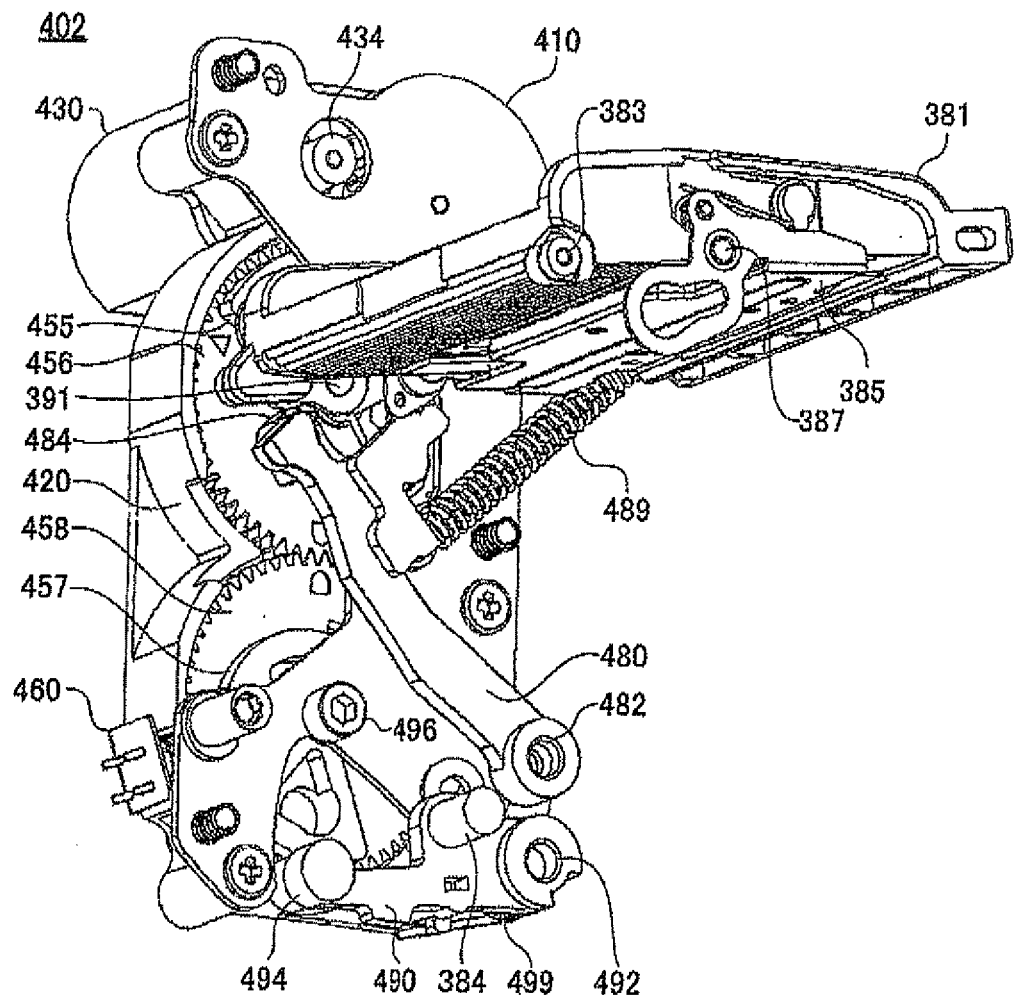
FIG. 13 is a partial perspective view of the mirror unit 402.

FIG. 13 is a perspective view showing a portion of the mirror unit 402 in another state. Specifically, FIG. 13 shows a state in which the cam follower 484 of the mirror drive lever 480 is fully raised and the main mirror 382 is at the image capturing position, in the same manner as in FIG. 7, as seen diagonally from the rear. Components that are the same as those in FIG. 12 are given the same reference numerals, and redundant explanations are omitted.

When the main mirror 382 is at the image capturing position, the cam follower 494 of the position-fixing pin drive lever 490 faces the attachment drive cam 457 at a portion thereof where the cam profile has a large diameter. Accordingly, the cam follower 494 is pressed downward in FIG. 13 and the position-fixing pin drive lever 490 is positioned at the end of the pivoting range in the counterclockwise direction.

The position-fixing pin 384 is arranged on the position-fixing pin drive lever 490 between the lever pivoting axle 492 and the cam follower 494. Accordingly, when the position-fixing pin drive lever 490 rotates counterclockwise in FIG. 13, the position-fixing pin 384 is lowered. Therefore, when the main mirror 382 reaches the image capturing position, the position-fixing pin 384 is withdrawn from the optical path of the image light.

In this way, when the main mirror 382 moves from the observation position toward the image capturing position, the position-fixing pin 384 is withdrawn from the optical path of the image light. Therefore, while the single-lens reflex camera 100 is performing image capturing, scattering of image light by the position-fixing pin 384 is prevented.

Furthermore, in the same manner as when the light blocking plate drive lever 470 is driven as an attachment, the attachment drive gear 458 drives the position-fixing pin drive lever 490 against the bias force of the position-fixing pin drive spring 499 while the main mirror 382 moves from the observation position to the image capturing position, i.e. while the bias force of the mirror drive spring 489 is being released. Accordingly, the load of the rotation actuator 430 can be decreased by the bias force of the mirror drive spring 489.

On the other hand, while the main mirror 382 is moving from the image capturing position to the observation position, i.e. while the mirror drive cam 455 drives the mirror drive lever 480 to accumulate the bias force (elastic energy) of the mirror drive spring 489, the position-fixing pin drive lever 490 moves the position-fixing pin 384 while releasing the bias force of the position-fixing pin drive spring 499. Accordingly, the load of the rotation actuator 430 is decreased by the bias force of the position-fixing pin drive spring 499.

In this way, in the mirror unit 402, the attachment drive gear 458 and the attachment drive cam 457 drive the position-fixing pin drive lever 490 and the position-fixing pin 384 attached to the mirror unit 402 as working parts. Since the and the mirror drive spring 489 and the position-fixing pin drive spring 499 store and release bias force in a complementary manner, the load of the rotation actuator 430 can be decreased.

In other words, the load placed on the rotation actuator 430 is restricted, and therefore a rotation actuator 430 with smaller output can be used. Therefore, the mirror unit 402 can be made smaller, quieter, and less expensive.

The above examples describe a case in which the attachment drive gear 458 drives the light blocking plate 312 and a case in which the attachment drive gear 458 drives the position-fixing pin 384. However, a single attachment drive gear 458 may be used to drive both the light blocking plate 312 and the position-fixing pin 384. Furthermore, another drive gear may be provided that operates together with the mirror drive gear 456 or the attachment drive gear 458, in order to drive another working section.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. An image capturing apparatus comprising:
a mirror unit comprising:
a movable mirror that pivots back and forth between an observation position and a withdrawn position;
a movable mirror drive section that accumulates bias force using drive force of a drive force source, and causes the movable mirror to pivot from one of the observation position and the withdrawn position to the other by releasing the accumulated bias force;
an attachment drive section that accumulates bias force using the drive force of the drive force source, and drives a working section other than the movable mirror with a predetermined timing relative to the back and forth pivoting of the movable mirror by releasing the accumulated bias force; and
an interlocking section that interlocks with the movable mirror and the attachment drive section, accumulates bias force in the attachment drive section while the movable mirror drive section releases bias force, and releases bias force from the attachment drive section while the movable mirror drive section accumulates bias force;
a light blocking wall that surrounds a periphery of the movable mirror and limits light incident to the movable mirror;
a light blocking plate that moves between an open position at which an opening formed in the light blocking wall is in communication with outside and a closed position at which the light blocking plate blocks the opening;
a focus sensor that is disposed outside the light blocking wall and, when the light blocking plate has moved to the open position, is exposed to the movable mirror through the opening; and
an image capturing section that captures image light incident to the mirror unit.

2. The image capturing apparatus according to claim 1, wherein a load placed on the drive force source when accumulating bias force in the movable mirror drive section is equal to a load placed on the drive force source when accumulating bias force in the attachment drive section.

3. The image capturing apparatus according to claim 1, wherein the mirror unit further comprises:
a position-fixing pin that moves between a protruding position at which the position-fixing pin protrudes from the light blocking wall on the same side as the movable mirror to fix the movable mirror in position and a withdrawn position at which the position-fixing pin is withdrawn to the side of the light blocking wall opposite the movable mirror, wherein the attachment drive section causes the position-fixing pin to move as the working section.

4. A device comprising:
a movable mirror drive section that accumulates a bias force using a drive force of a drive force source, and causes a movable mirror to pivot between an observation position and a withdrawn position by releasing the accumulated bias force;
an attachment drive section that accumulates bias force using the drive force of the drive force source, and drives a working section other than the movable mirror with a predetermined timing relative to the back and forth pivoting of the movable mirror by releasing the accumulated bias force;
an interlocking section that interlocks with the movable mirror and the attachment drive section, accumulates the bias force in the attachment drive section while the movable mirror drive section releases the bias force, and releases the bias force from the attachment drive section while the movable mirror drive section accumulates the bias force;
a light blocking wall that surrounds a periphery of the movable mirror and limits light incident to the movable mirror;
a light blocking plate that moves between an open position, at which an opening formed in the light blocking wall is not blocked, and a closed position, at which the light blocking plate blocks the opening;
a focus sensor that is disposed such that when the light blocking plate has moved to the open position, the focus sensor is exposed to the movable mirror through the opening; and
an image capturing section that captures image light incident to the mirror unit.

5. The device according to claim 4, wherein a load placed on the drive force source when accumulating bias force in the movable mirror drive section is equal to a load placed on the drive force source when accumulating bias force in the attachment drive section.

6. The device according to claim 4, wherein the working section is a position-fixing pin that moves between a protruding position, at which the position-fixing pin protrudes from the light blocking wall to fix the movable mirror, and a withdrawn position, at which the position-fixing pin is withdrawn to a side of the light blocking wall opposite the movable mirror.

7. An image capturing apparatus comprising:
a movable mirror that pivots between an observation position and a withdrawn position;
a movable mirror drive section that accumulates bias force using drive force of a drive force source, and causes the movable mirror to pivot between the observation position and the withdrawn position by releasing the accumulated bias force;
an attachment drive section that accumulates bias force using the drive force of the drive force source, and drives a working section other than the movable mirror with a predetermined timing relative to the back and forth pivoting of the movable mirror by releasing the accumulated bias force;
an interlocking section that interlocks with the movable mirror and the attachment drive section, accumulates bias force in the attachment drive section while the movable mirror drive section releases bias force, and releases bias force from the attachment drive section while the movable mirror drive section accumulates bias force;
a light blocking wall that surrounds a periphery of the movable mirror and limits light incident to the movable mirror;

a light blocking plate that moves between an open position, at which an opening formed in the light blocking wall is not blocked, and a closed position, at which the light blocking plate blocks the opening; and an image capturing section operable to capture light incident to the movable mirror.

8. The apparatus according to claim 7, wherein a load placed on the drive force source when accumulating bias force in the movable mirror drive section is equal to a load placed on the drive force source when accumulating bias force in the attachment drive section.

9. The apparatus according to claim 7, further comprising a focus sensor that is disposed such that when the light blocking plate has moved to the open position, the focus sensor is exposed to the movable mirror through the opening.

10. The apparatus according to claim 7, wherein the working section is a position-fixing pin that moves between a protruding position, at which the position-fixing pin protrudes from the light blocking wall to fix the movable mirror, and a withdrawn position, at which the position-fixing pin is withdrawn to a side of the light blocking wall opposite the movable mirror.

* * * * *